US006804655B2

(12) United States Patent
Dokic et al.

(10) Patent No.: US 6,804,655 B2
(45) Date of Patent: Oct. 12, 2004

(54) SYSTEMS AND METHODS FOR TRANSMITTING BURSTY-ASNYCHRONOUS DATA OVER A SYNCHRONOUS LINK

(75) Inventors: Miroslav Dokic, Austin, TX (US); Sanjay Joshi, Austin, TX (US); Vladimir Mesarovic, Austin, TX (US); Raghunath Rao, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 665 days.

(21) Appl. No.: 09/778,229

(22) Filed: Feb. 6, 2001

(65) Prior Publication Data

US 2002/0152083 A1 Oct. 17, 2002

(51) Int. Cl.[7] .................................... G01L 19/00
(52) U.S. Cl. .................................... 704/500; 370/350
(58) Field of Search .................................... 704/500, 503, 704/504; 370/350, 356

(56) References Cited

U.S. PATENT DOCUMENTS 5,054,020 A * 10/1991 Meagher .................... 370/305
5,740,306 A * 4/1998 Shinohara et al. ............ 386/67
6,584,443 B1 * 6/2003 Kawamura et al. ......... 704/500

* cited by examiner

*Primary Examiner*—Daniel Abebe
(74) *Attorney, Agent, or Firm*—Thompson & Knight LLP

(57) ABSTRACT

A method for transferring data bursts via a synchronous data link includes the step of receiving a burst of packets, each packet including a header and a frame of data compressed at a selected sampling rate and transmitted at a selected bit rate. At least one of the packets of the stream of packets is embedded into a carrier frame including a carrier frame header. The carrier frame is then transmitted via the synchronous link. The data frame is extracted from the carrier frame and decompressed at the sample rate.

21 Claims, 7 Drawing Sheets

Uniform Frame Delivery

SYSTEMS AND METHODS FOR TRANSMITTING BURSTY-ASNYCHRONOUS DATA OVER A SYNCHRONOUS LINK

CROSS-REFERENCE TO RELATED APPLICATIONS

This application for patent is related to the following applications for patent:

Pending U.S. patent application Preliminary Ser. No. 09/707,875 filed Nov. 7, 2000 by the inventors Rao, Gangishetti, and Dokic, and entitled "DIGITAL TONE CONTROLS AND SYSTEMS USING THE SAME"

BACKGROUND OF THE INVENTION

1. Field of the Invention

The present invention relates in general to multimedia circuits and systems and in particular to circuits systems and methods for transmitting bursty-asynchronous data over a synchronous link 2. Description of the Related Art There are currently a number of standardized protocols for interfacing the various audio and video devices in multimedia systems. Each of these protocols has certain advantages, depending on such factors as the hardware, software, type of data and layer in the architecture hierarchy involved. Consequently, to optimize system design, including minimization of the cost and complexity of the hardware and software, techniques are required to reconcile the use of the different interface protocols at various points in the system.

SUMMARY OF THE INVENTION

A method is disclosed for transferring data bursts via a synchronous data link. A burst of packets, each packet including a packet header and a frame of data compressed at a selected sampling rate and at a selected bit rate is received. At least one of the packets of the stream of packets is embedded into a carrier frame including a carrier frame header. The carrier frame is then transmitted via the synchronous link, the data frame extracted from the carrier frame at the receiving terminal, and the frame of compressed data decompressed at the sample rate.

Systems and methods embodying the inventive principles have substantial advantages over the prior art. Among other things, bursty-asynchronous data can be transmitted over a synchronous link, including a conventional IEC61937 data link. In addition, the provision of embedded presentation time stamps in the novel formatted data stream allows for synchronization of playback of the embedded data with a system time clock. The inventive principles are particularly useful in the transmission of audio data in multimedia systems, although not necessarily limited thereto.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIG. 1–6 of the drawings, in which like numbers designate like parts.

Figure 1A:
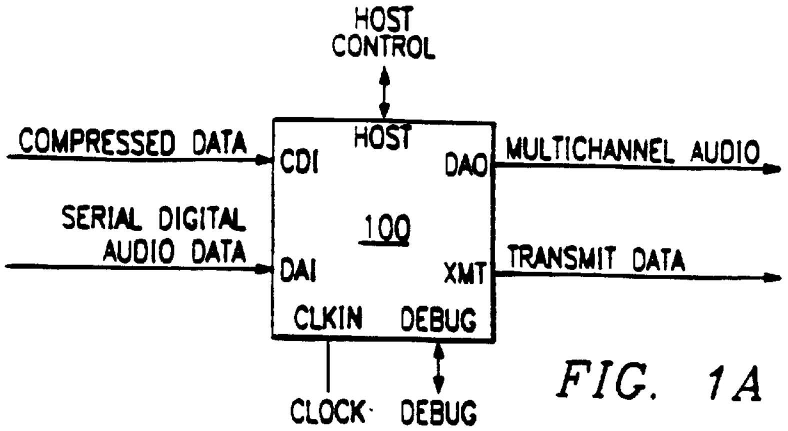
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data conforming to the AC-3 digital audio compression standard, (as defined by the United States Advanced Television System Committee) through a compressed data input port CDI. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 Bitstreams. Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency coefficients. Generally, these overlapping blocks, each composed of 512 time samples, are multiplied by a time window and transformed into the frequency domain. Because the blocks of time samples overlap, each PCM input sample is represented by two sequential blocks factor transformated into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encoding each mantissa. The spectral envelope and the coarsely quantized mantissas for six audio blocks (1536 audio samples) are formatted into an AC-3 frame. An AC-3 bit stream is a sequence of the AC-3 frames. Each representing 1536 audio samples in time, irrespective of sampling frequency, number of channels or the compressed bitrate.

In addition to the transformed data, the AC-3 bit stream also includes additional information. For instance, each frame may include a frame header which indicates the bit rate, sample rate, and similar information necessary to subsequently synchronize and decode the AC-3 bit stream. Error detection codes are also inserted such that the device such as decoder 100 can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the Advanced Televisions Systems Committee, incorporated herein by reference.

In order to decompress under the AC-3 standard, decoder 100 essentially must perform the inverse of the above described process. Among other things, decoder 100 synchronizes to the received AC-3 bit stream, checks for errors and deformats the received AC-3 data audio. In particular, decoder 100 decodes spectral envelope and the quantitized mantissas. A bit allocation routine is used to unpack and de-quantize the mantissas. The spectral envelope is encoded to produce the exponents, then, a reverse transformation is performed to transform the exponents and mantissas to decoded PCM samples in the time domain. Subsequently, post processing of the PCM audio can be performed using various algorithms including equalization, digital tone control and bass management. The final PCM is converted to an analog signal via a DAC and then processed by a typical analog signal chain to speakers.

Figure 1B:
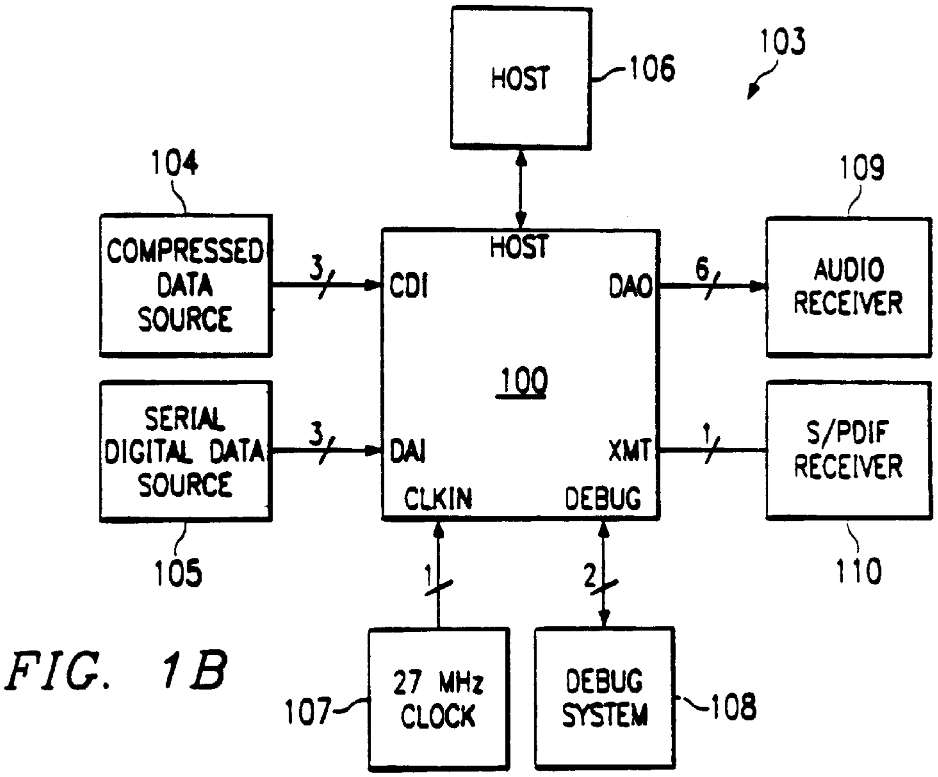
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio source 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to an S/PDIF receiver 110. These outputs may be coupled, for example, to digital to analog converters or codecs for transmission to analog receiver circuitry.

Figure 1C:
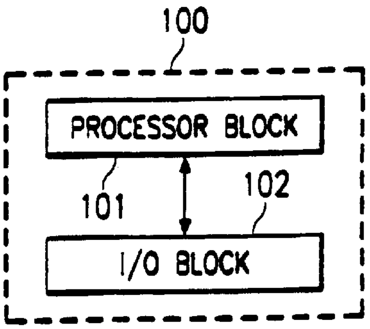
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and the 101 Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
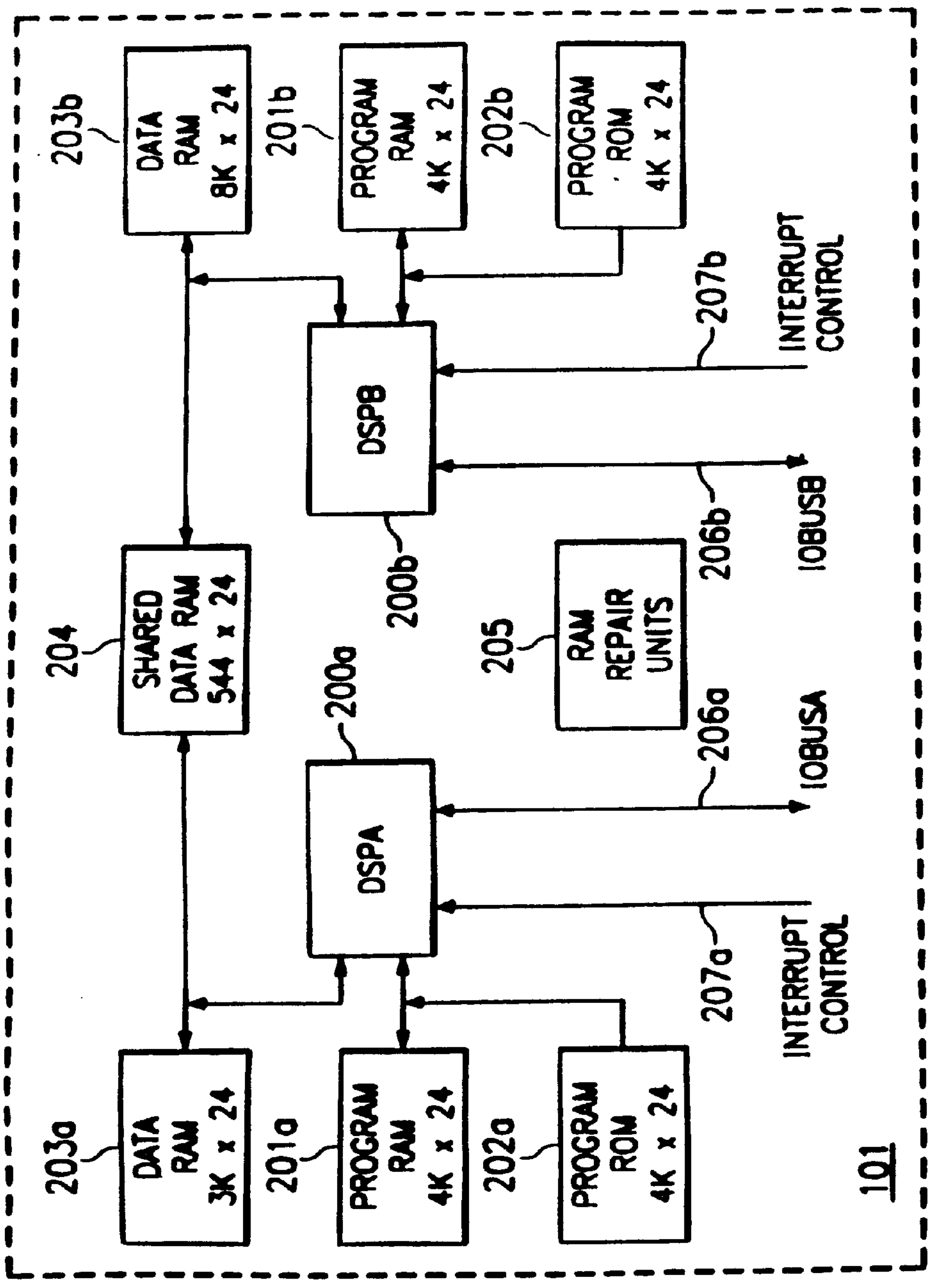
FIG. 2 is a diagram of the processor block of FIG. 1C.

FIG. 2 is a detailed functional block diagram of processor block 101. Processor block 101 includes two DSP cores 200*a* and 200*b*, labeled DSPA and DSPB respectively. Cores 200*a* and 200*b* operate in conjunction with respective dedicated program RAM 201*a* and 201*b*, program ROM 202*a* and 202*b*, and data RAM 203*a* and 203*b*. Shared data RAM 204, which the DSPs 200*a* and 200*b* can both access, provides for the exchange of data, such as PCM data and processing coefficients, between processors 200*a* and 200*b*. Processor block 101 also contains a RAM repair unit 205 that can repair a predetermined number of RAM locations within the on-chip RAM arrays to increase die yield.

DSP cores 200*a* and 200*b* respectively communicate with the peripherals through I/O Block 102 via their respective I/O buses 206*a*, 206*b*. The peripherals send interrupt and flag information back to the processor block via interrupt interfaces 207*a*, 207*b*.

Figure 3:
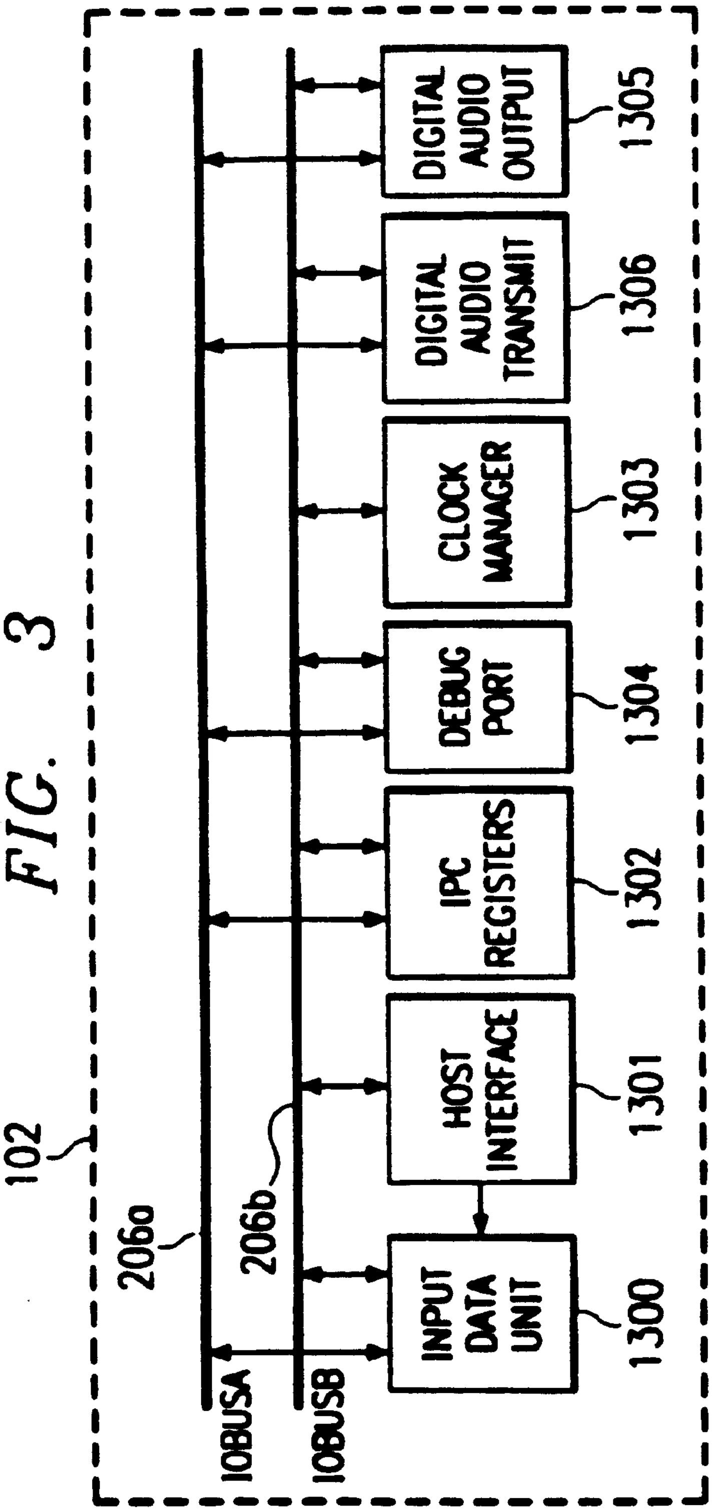
FIG. 3 is a diagram of the primary functional subblocks of the I/O block of FIG. 1C.

FIG. 3 is a detailed functional block diagram of I/O block 102. Generally, I/O block 102 contains peripherals for data input, data output, communications, and control. Input Data Unit 1300 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200*a*)or DSPB (200*b*). Any read or write conflicts are resolved by treating DSPB as the master and ignoring DSPA.

In a dual-processor environment like decoder 100, it is important to partition the software application optimally between the two processors 200*a*, 200*b* to maximize processor usage and minimize inter-processor communication. For this, the dependencies and scheduling of the tasks of each processor must be analyzed. The algorithm must be partitioned such that one processor does not unduly wait for the other and later be forced to catch up with pending tasks. For example, in most audio decompression tasks including Dolby AC-3®, the algorithm being executed consists of 2 major stages: 1) parsing the input bitstream with specified/computed bit allocation and generating frequency-domain transform coefficients for each channel; and 2) performing the inverse transform to generate time-domain PCM samples for each channel. Based on this and the hardware resources available in each processor, and accounting for other housekeeping tasks the algorithm can be suitably partitioned.

Usually, the software application will explicitly specify the desired output precision, dynamic range and distortion requirements. Apart from the intrinsic limitation of the compression algorithm itself, in an audio decompression task the inverse transform (reconstruction filter bank) is the stage which determines the precision of the output. Due to the finite-length of the registers in the DSP, each stage of processing (multiply+accumulate) will introduce noise due to elimination of the lesser significant bits. Adding features such as rounding and wider intermediate storage registers can alleviate the situation.

For example, Dolby AC-3® requires 20-bit resolution PCM output which corresponds to 120 dB of dynamic range. The decoder uses a 24-bit DSP which incorporates rounding, saturation and 48-bit accumulators in order to achieve the desired 20-bit precision. In addition, analog performance should at least preserve 95 dB S/N and have a frequency response of +/−0.5 dB from 3 Hz to 20 kHz.

Based on application and design requirements, a complex real-time system, such as audio decoder 100, is usually partitioned into hardware, firmware and software. The hardware functionality described above is implemented such that it can be programmed by software to implement different applications. The firmware is the fixed portion of software portion including the boot loader, other fixed function code and ROM tables. Since such a system can be programmed, it is advantageously flexible and has less hardware risk due to simpler hardware demands.

There are several benefits to the dual core (DSP) approach according to the principles of the present invention. DSP cores 200A and 200B can work in parallel, executing different portions of an algorithm and increasing the available processing bandwidth by almost 100%. Efficiency improvement depends on the application itself. The important thing in the software management is correct scheduling, so that the DSP engines 200A and 200B are not waiting for each other. The best utilization of all system resources can be achieved if the application is of such a nature that can be distributed to execute in parallel on two engines. Fortunately, most of the audio compression algorithms fall into this category, since they involve a transform coding followed by fairly complex bit allocation routine at the encoder. On the decoder side the inverse is done. Firstly, the bit allocation is recovered and the inverse transform is performed. This naturally leads into a very nice split of the decompression algorithm. The first DSP core (DSPA) works on parsing the input bitstream, recovering all data fields, computing bit allocation and passing the frequency domain transform coefficients to the second DSP (DSPB), which completes the task by performing the inverse transform (IFFT or IDCT depending on the algorithm). While the second DSP is finishing the transform for a channel n, the first DSP is working on the channel n+1, making the processing parallel and pipelined. The tasks are overlapping in time and as long as tasks are of similar complexity, there will be no waiting on either DSP side. Once the transform for each channel is completed, DSPB can postprocess this PCM data according to the desired algorithm, which could include digital tone control.

Figure 4:
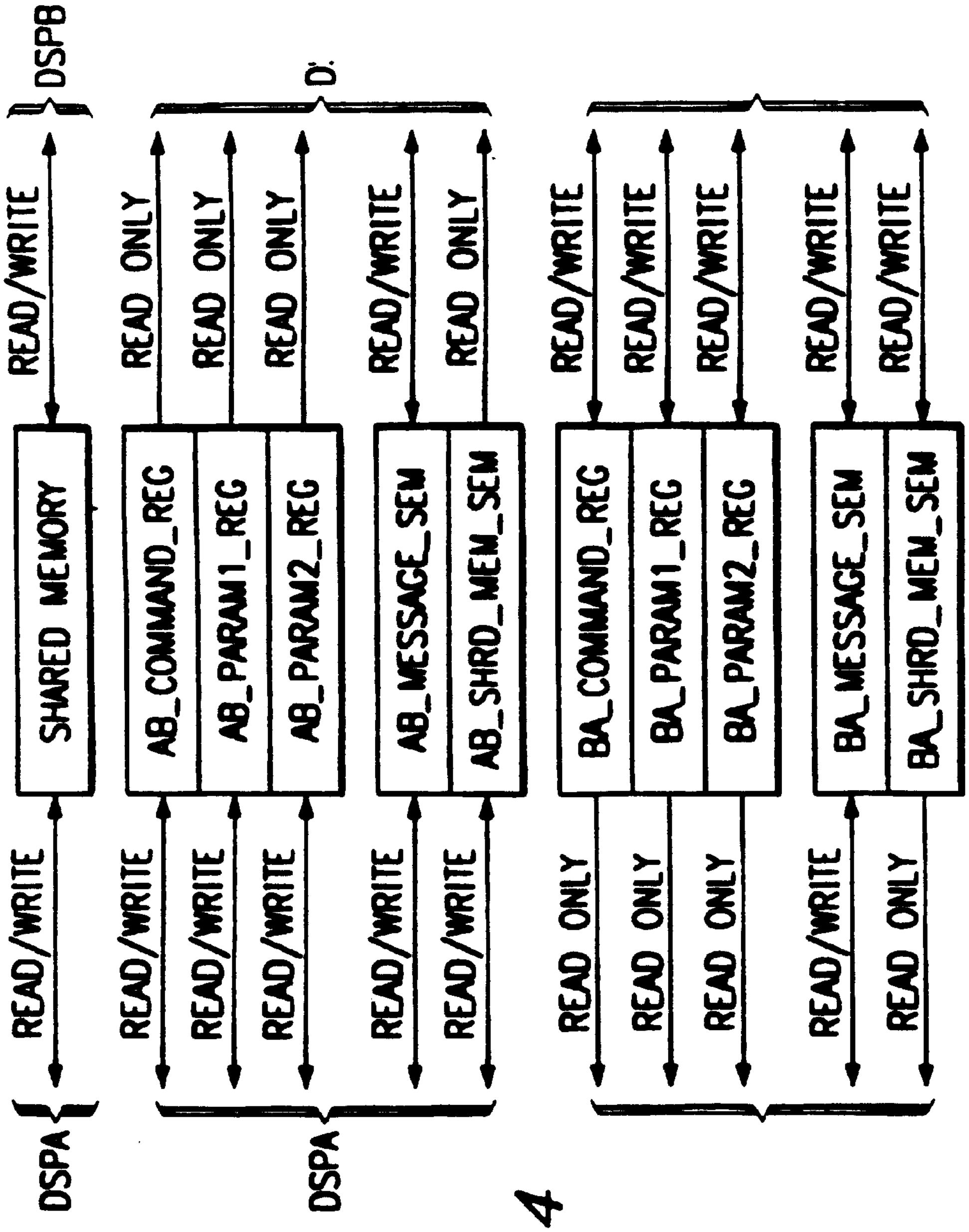
FIG. 4 is a diagram of the interprocessor communications (IPC) registers as shown in FIG. 3

Decoder 100, as discussed above, includes shared memory of 544 words as well as communication "mailbox" (IPC block 1302) consisting of 10 I/O registers (5 for each direction of communication). FIG. 4 is a diagram representing the shared memory space and IPC registers (1302).

One set of communication registers looks like this (a) AB_command_register (DSPA write/read, DSPB read only)

(b) AB_parameter1_register (DSPA write/read, DSPB read only)

(c) AB_parameter2_register (DSPA write/read, DSPB read only)

(d) AB_message_semaphores (DSPA write/read, DSPB write/read as well)

(e) AB_shared_memory_semaphores (DSPA write/read, DSP B read only) where AB denotes the registers for communication from DSPA to DSPB. Similarly, the BA set of registers are used in the same manner, with simply DSPB being primarily the controlling processor.

Shared memory 204 is used as a high throughput channel, while communication registers serve as low bandwidth channel, as well as semaphore variables for protecting the shared resources.

Both DSPA and DSPA 200*a,* 200*b* can write to or read from shared memory 204. However, software management provides that the two DSPs never write to or read from shared memory in the same clock cycle. It is possible, however, that one DSP writes and the other reads from shared memory at the same time, given a two-phase clock in the DSP core. This way several virtual channels of communications could be created through shared memory. For example, one virtual channel is transfer of frequency domain coefficients of AC-3 stream and another virtual channel is transfer of PCM data independently of AC-3. While DSPA is putting the PCM data into shared memory, DSPB might be reading the AC-3 data at the same time. In this case both virtual channels have their own semaphore variables which reside in the AB_shared_memory_semaphores registers and also different physical portions of shared memory are dedicated to the two data channels. AB_command_register is connected to the interrupt logic so that any write access to that register by DSPA results in an interrupt being generated on the DSP B, if enabled. In general, I/O registers are designed to be written by one DSP and read by another. The only exception is AB_message_sempahore register which can be written by both DSPs. Full symmetry in communication is provided even though for most applications the data flow is from DSPA to DSP B. However, messages usually flow in either direction, another set of 5 registers are provided as shown in FIG. 4 with BA prefix, for communication from DSPB to DSPA.

The AB_message_sempahore register is very important since it synchronizes the message communication. For example, if DSPA wants to send the message to DSPB, first it must check that the mailbox is empty, meaning that the previous message was taken, by reading a bit from this register which controls the access to the mailbox. If the bit is cleared, DSPA can proceed with writing the message and setting this bit to 1, indicating a new state, transmit mailbox full. DSPB may either poll this bit or receive an interrupt (if enabled on the DSPB side), to find out that new message has arrived. Once it processes the new message, it clears the flag in the register, indicating to DSPA that its transmit mailbox has been emptied. If DSPA had another message to send before the mailbox was cleared it would have put in the transmit queue, whose depth depends on how much message traffic exists in the system. During this time DSPA would be reading the mailbox full flag. After DSPB has cleared the flag (set it to zero), DSPA can proceed with the next message, and after putting the message in the mailbox it will set the flag to 1. Obviously, in this case both DSPs have to have both write and read access to the same physical register. However, they will never write at the same time, since DSPA is reading flag until it is zero and setting it to 1, while DSPB is reading the flag (if in polling mode) until it is 1 and writing a zero into it. These two processes a staggered in time through software discipline and management.

When it comes to shared memory a similar concept is adopted. Here the AB_shared_memory_semaphore register is used. Once DSPA computes the transform coefficients but before it puts them into shared memory, it must check that the previous set of coefficients, for the previous channel has been taken by the DSPB. While DSPA is polling the semaphore bit which is in AB_shared_memory_semaphore register it may receive a message from DSPB, via interrupt, that the coefficients are taken. In this case DSPA resets the semaphore bit in the register in its interrupt handler. This way DSPA has an exclusive write access to the AB_shared_memory_semaphore register, while DSPB can only read from it. In case of AC-3, DSPB is polling for the availability of data in shared memory in its main loop, because the dynamics of the decode process is data driven. In other words there is no need to interrupt DSPB with the message that the data is ready, since at that point DSPB may not be able to take it anyway, since it is busy finishing the previous channel. Once DSPB is ready to take the next channel it will ask for it. Basically, data cannot be pushed to DSPB, it must be pulled from the shared memory by DSPB.

The exclusive write access to the AB_shared_memory_semaphore register by DSPA is all that more important if there is another virtual channel (PCM data) implemented. In this case, DSPA might be putting the PCM data into shared memory while DSPB is taking AC-3 data from it. So, if DSPB was to set the flag to zero, for the AC-3 channel, and DSPA was to set PCM flag to 1 there would be an access collision and system failure will result. For this reason, DSPB is simply sending message that it took the data from shared memory and DSPA is setting shared memory flags to zero in its interrupt handler. This way full synchronization is achieved and no access violations performed.

For a complete description of exemplary decoder 100 and its advantages, reference is now made to coassigned U.S. Pat. No. 6,081,783 entitled "DIGITAL AUDIO DECODING CIRCUITRY, METHODS AND SYSTEMS" granted Jun. 27, 2000 and incorporated herein by reference.

In a conventional synchronous IEC61937 data stream, the basic data frame structure includes a header, typically composed of four preambles (Pa,Pb,Pc,Pd), the payload itself, and a string of padding bits (zeros). The first two preambles (Pa and Pb) are constants 0xF872 and 0x4E1F are used for synchronization, while the third preamble Pc carries control information including a payload type identifier. Preamble Pd sets the length of the payload, up to 65535 bits. In a standard audio stream, the payload can be, for example, AC-3, AAC or MPEG encoded data. The length of the payload is a function of the type of data, the sampling rate used to encode these data and bit rate the data are provided to the IEC61937 transmitter. The padding bits, conventionally all logic zeros, make up the remaining portion of the burst not otherwise carrying preamble or payload data. Among other things, the padding bits allow for a specified spacing to be maintained between frames.

Consider, for purposes of discussion, a stream of bursts of AC-3 encoded data. Each burst corresponds to one AC-3 frame. This bitstream can be segmented into 16-bit words, which can then replace conventional PCM data (alternate samples of Left and Right channels) carried over a synchronous interface. Note that the AC-3 frame itself is preceded by the preambles. The specified preambles each comprise one 16-bit word such that the four preambles taken together are equivalent in time to two sample time intervals. For conventional AC-3 data, each burst, including the preambles, payload and padding, has a fixed repetition period of 1536 sample periods or 32 msec at a sampling frequency of 48 kHz and bit rate of 384 kbps. In this case, the width of the AC-3 audio payload is computed as Words/frame=(rbits/sec)*(samples/frame)/16*(samples/sec)), which works out to be 768 16-bit words. Since this occupies 384 sample times in the synchronous 48 kHz stereo PCM interface, and the preambles occupy another 2 sample times, zero padding of 1536−384−2=1150 samples (2300 16-bit words) is required before the start of the next AC-3 frame (with preambles first).

A standard IEC61937 synchronous data stream is not suitable in all systems, particularly those processing bursty-asynchronous data. In a bursty-asynchronous system, data are transmitted only when the transmitting device has the data ready and/or when the receiving device is ready to receive data possibly having issued a request. The advantage of this type of system in comparison to a fully synchronous (constant bit rate) system is speed. In the bursty system, data transmission can be performed as the data and hardware are ready while in the constant bit rate system, transmission of data is constrained by synchronization with the data structures of the carrier. The amount of data in a burst is a function of the specific stream. For example, audio data in PES packets are transferred in 188 byte bursts in the case of an MPEG2 transport stream.

One particular case where bursty asynchronous data is useful is in systems processing both audio and video data. Here, an audio/video data stream, from a broadcast source for example, is delivered to a Audio/Video "combo" chip multiplexed in a transport stream. In most cases, this chip has limited audio decoding capability and therefore the audio must be split off and sent to an external audio decoder for decompression and decoding. However, typically the only interface available to transmit the audio data to the audio decoder is a conventional synchronous link limited to supporting the transport of decoded (PCM) audio data. In other words, no capability is available for delivering bursty asynchronous compressed audio data to the external audio decoder.

Moreover, the video data is typically bursted at a higher rate than the audio data. As a result, an additional problem must be addressed; namely, proper synchronization of the audio and video data streams such that the final presentation to the user is visually pleasing. Although one could try to pre-synchronize the compressed data and use a conventional IEC61937 output, no provision is made with respects to audio/video synchronization in the context of a conventional audio link. Also, using IEC61937 precludes the possibility of any fine control over A/V synchronization, since the only control possible is to account for the audio decode latency and time the IEC61937 delivery accordingly at the start up. Once such a system is up and running, no runtime A/V sync control is possible.

Figure 5:
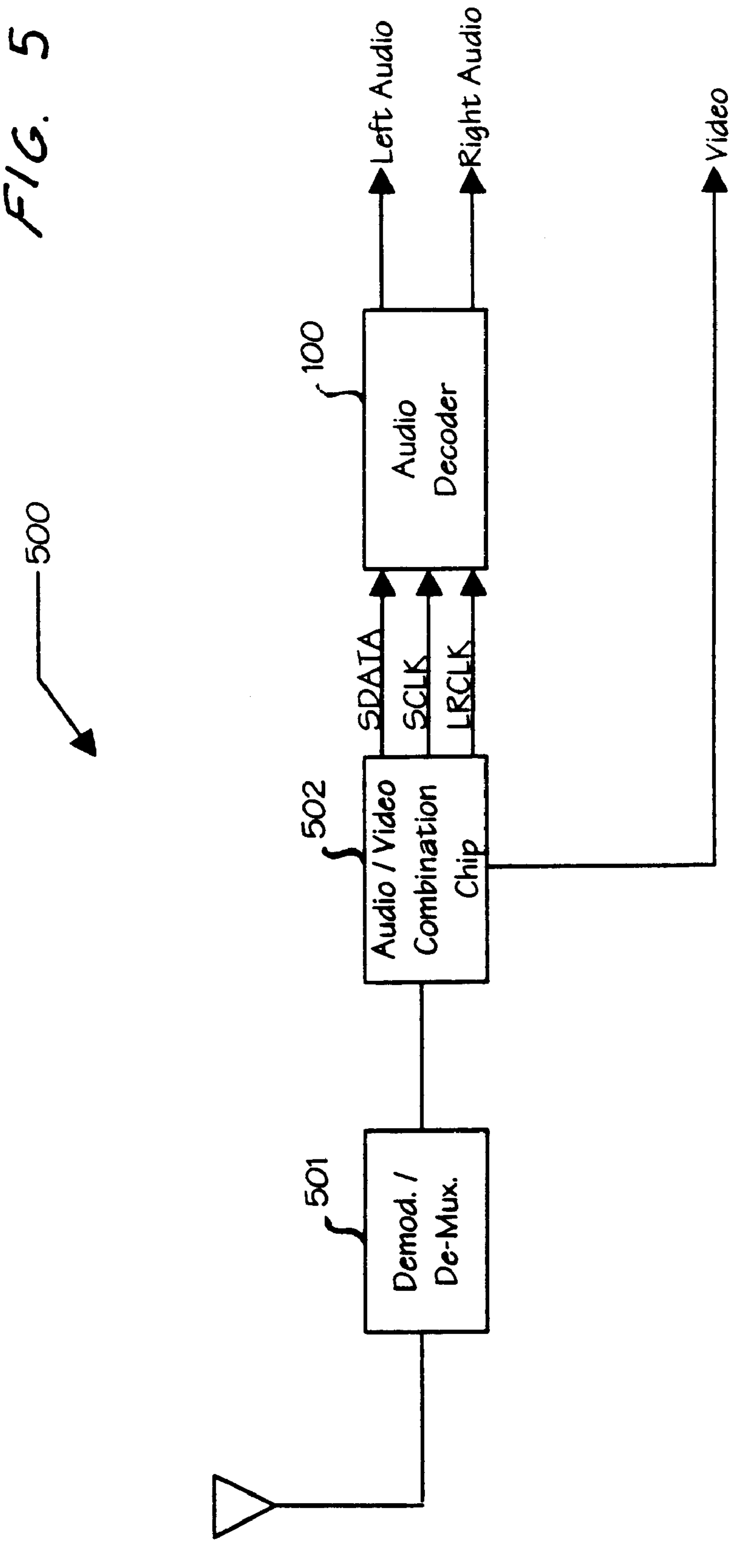
FIG. 5 is a high level functional block diagram of a portion of an exemplary multimedia system.

The principles of the present invention address both the problem of transmitting bursty asynchronous data via a synchronous link and the problem of synchronizing the audio and video streams in a combination audio video system. For purposes of discussion, an exemplary broadcast system 500 is shown in FIG. 5 In this case data is received from a transmission device, such as a wireless or cable broadcast station in the form of a transport stream, such as an MPEG2 transport stream. The transport stream is a multiplex of audio, video, system control and programming information. For purposes of the present discussion, it be assumed that the audio and video data are multiplexed into the transport stream as Packetized Elementary Streams (PES).

At the receiver, the data are extracted from the given carrier signal by a demodulator-demultiplexer 501. Audio-Video Combo 502 chip splits out the compressed audio PES stream and transmits it to either the DAI port or the CDI port (selected during device configuration) of audio decoder 100 via using the data structure and link described as follows.

In the preferred embodiment, data are transmitted from the combination A/V chip to audio decoder 100 via a three line link carrying the serial data, a serial clock (SCLK) and an left-right (LR) clock. In order to carry the 2 16-bit words per sample time, the SCLK is at least 32 times the data sampling rate (32 fs) and the LRCLK signals the start of each 16-bit word of left and right channel data from each sample pair. Notwithstanding, the physical connection can vary from embodiment to embodiment. For example, single wire link carrying data and embedded clocks could be used, such as the Sony/Phillips Digital Interface (S/PDIF).

Figures 6A, 6B, 6C:
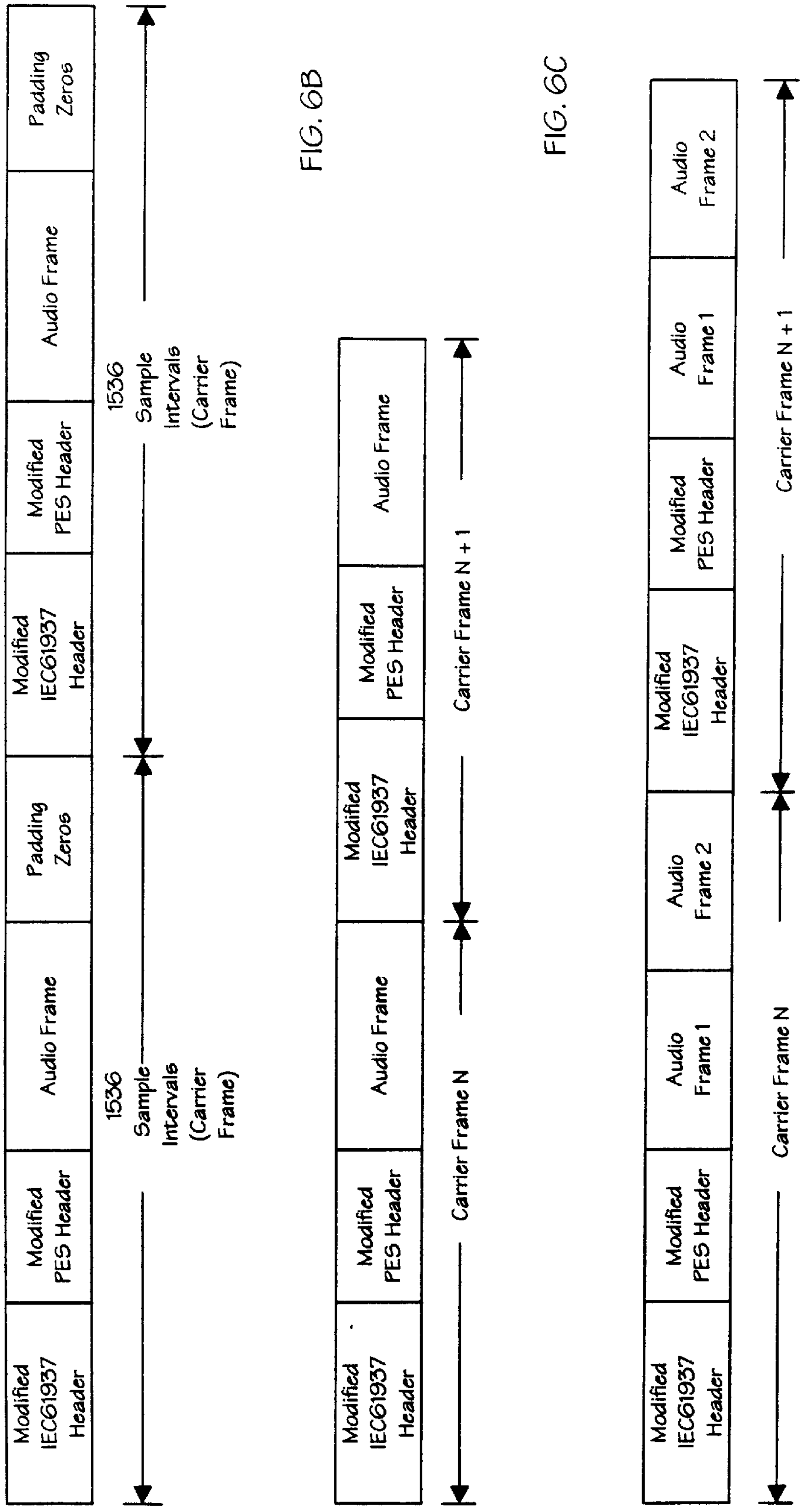
FIGS. 6A–6D are diagrams illustrating preferred data structures suitable for transmitting bursty-asynchronous data across an asynchronous link in accordance with the inventive concepts.

A portion of an exemplary bitstream for Uniform Frame Delivery in accordance with the invention is shown in FIG. 6A. (Back to Back Frame Delivery example will be discussed below with respects to FIGS. 6B and 6C).

As shown in FIG. 6A, data are transported as data structures (frames) including a modified IEC61937 header, a modified PES (Packetized Elementary Stream) header, a frame of audio data and padding zeros. Here, the spacing between any arbitrarily selected IEC61937 preambles is not necessarily fixed, although preferably the average over time approaches the IEC61937 specification value. In the AC3 example, the spacing between IEC61937 preambles may randomly vary from the nominal 1536 sample periods, although the average spacing will approach the 1536 sample period value.

Preambles Pa and Pb remain unchanged from their standard format and allow the receiving device to capture the data stream at a randomly selected point. In preamble Pc, the burst-info field is modified to indicate the non-standard nature of the frame while preamble Pd is modified to take into account the addition of the modified PES header to the frame. In the preferred embodiment, the modified PES header is composed of 8 bytes; therefore, the modified Pd preamble must now represent the length of the modified PES header (8 bytes) plus the length of the data payload.

The length of the data payload will depend on the sampling frequency and the bit rate:

$$\text{Payload Length in words}=\text{Bit rate}*\text{samples per frame}/(16*\text{sampling freq}). \quad (1)$$

Hence, for an AC3 frame (1536 samples per frame) at a bit rate of 384 kbps and a sampling rate of 48 kHz, in the case of uniform frame delivery, the data payload is 768 16-bit words long.

In a broadcast system, the sampling rate will typically remain constant for a given program. The bit rate however may change as data becomes ready at the transmission end. The padding zeros are used to fill the unused portion in the Uniform Frame Delivery case of FIG. 6A.

The modified PES header does not include the Packet Start Code Prefix, Stream ID or Packet Length fields found in a standard PES header, since this information is now available from the IEC header. The preferred for the modified PES header are given in TABLE 1:

| Byte | Field | No. Of Bits |
|---|---|---|
| Byte 1 | Marker bits | 2 (always ‘10’) |
| | PES_scrambling_control | 2 |
| | PES_proirity | 1 |
| | Data_alignment_indicator | 1 |
| | Copyright | 1 |
| | Original_or_copy | 1 |
| Byte 2 | PTS_DTS_flags | 2 (always ‘10’ or ‘00’) |
| | ESCR_flag | 1 (always ‘0’) |
| | ES_rate_flag | 1 (always ‘0’) |
| | DSM_trick_mode_flag | 1 (always ‘0’) |
| | Additional_copy_info_flag | 1 (always ‘0’) |
| | PES_CRC_flag | 1 (always ‘0’) |
| | PES_extension_flag | 1 (always ‘0’) |
| Byte 3 | PES_header_data_length | 8 (always ‘00000101’) |
| Byte 4 | Marker Bits | 4 (always ‘0010’) |
| | PTS [32 . . . 30] | 3 |
| | Marker bit | 1 (always ‘1’) |
| Byte5 | PTS[29 . . . 22] | 8 |
| Byte6 | PTS[21 . . . 15] | 7 |
| | Marker bit | 1 (always ‘1’) |
| Byte7 | PTS [14 . . . 7] | 8 |
| Byte8 | PST[6 . . . 0] | 7 |
| | Marker bit | 1 (always ‘1’) |

At least some of the PES headers carry a 5-byte Audio Presentation Time Stamp for synchronizing audio and video data via the System Time Clock (STC). This advantageously allows for the perfect synchronization of the audio data with the video data in the audio decoder.

If a PTS has not been generated with respect to a given PES header, the PTS field can be set to all zeros or the previous PTS simply repeated. In either case, the PTS_DTS flags are set to indicate that this value is not a valid PTS. It is possible, however, to synthesize the missing PTS, if needed, based on the sampling frequency and the number of samples in the audio frame. In the current AC3 example, and assuming a 90 kHz STC the calculation is:

$$\text{Next\_Frame\_A\_PTS}=\text{Current\_Frame\_A\_PTS}+(1536/48000)*90{,}000. \quad (2)$$

As already noted in accordance with the inventive concepts, the spacing between IEC headers is not necessarily constant and therefore the length and number of PES packets per IEC frame can vary. Moreover, a given PES packet can be split, such that a portion of the PES packet is transported in a first IEC frame and the remainder on the following IEC frame. Additionally, each PES header can be associated with more than one audio frame, so long as the maximum spacing of 700 ms between PES headers, as specified in the MPEG-2 system specification, is not exceeded.

FIG. 6B illustrates one example of Back-to-Back Frame Delivery. In this case, data are being delivered faster than the nominal 32 ms frame interval discussed above. In this example, no padding zeros are inserted. The spacing between IEC headers varies as data becomes available and are delivered.

Figure 6D:
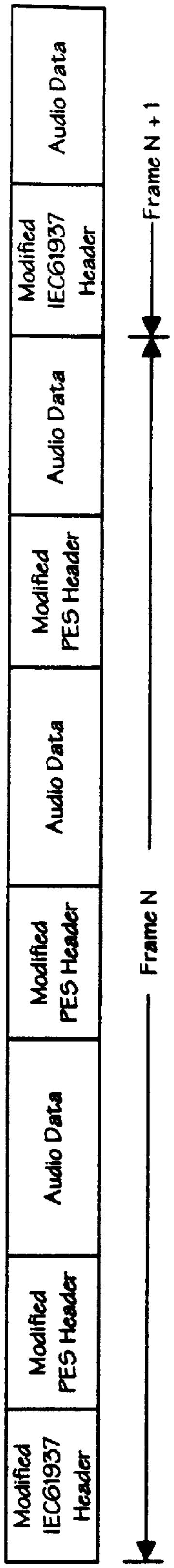

FIG. 6C is an example of a portion of a data stream where multiple PES packets are packed into a single IEC61937 frame, with the last packet being split with the following frame. FIG. 6D illustrates the case where a PES packet has been split between two IEC61937 carrier frames.

In sum, the principles of the present invention provide two major advantages. First, bursty asynchronous data can be transmitted via a commonly available IEC61937 synchronous interface to an external audio decoder for decompression/decoding. Second, since Presentation Time Stamps are transmitted along with the data, the external audio decoder can perfectly synchronize the audio data with the video data using the System Time Clock.

Although the present invention and its advantages have been described in detail, it should be understood that various changes, substitutions and alterations can be made herein without departing from the spirit and scope of the invention as defined by the appended claims.

What is claimed is:

1. A method for transferring data bursts via a synchronous data link comprising the steps of:

receiving a burst of packets each including a packet header and a frame of data compressed at a selected sampling rate for transmission at a selected bit rate, the burst of packets forming a portion of a packetized elementary stream having a modified header including a presentation time stamp;

embedding at least one of the packets of the stream of packets into a carrier frame including a carrier frame header;

transmitting the carrier frame via a synchronous link;

locating the carrier frame by detecting the carrier frame header;

extracting the data frame from the carrier frame; and decompressing the frame of data at the sample rate.

2. The method of claim 1 wherein said frame of data is compressed in accordance with a selected one of the MPEG, AAC and AC-3 compression algorithms.

3. The method of claim 1 wherein the carrier frame header comprises a modified IEC61937 header.

4. The method of claim 1 wherein the carrier frame comprises one of a plurality of uniformly spaced carrier frames.

5. A The method of claim 1 wherein the carrier frame comprises one of a plurality of non-uniformly spaced carrier frames.

6. The method of claim 1 wherein the frame of data comprises a frame of audio data.

7. The method of claim 1 and further comprising the step of synchronizing a stream of decompressed data with a system time clock with the presentation time stamp.

8. The method of claim 1 wherein the carrier frame contains a plurality of frames of audio data.

9. The methods of claim 1 wherein a single audio frame of data is carried broken across a plurality of consecutive carrier frames.

10. A data structure for transmitting bursty asynchronous audio data across a synchronous link comprising:

a frame of audio data;

a first header associated with the frame of audio data including a presentation time stamp and a set of flags; and a carrier frame, the frame of audio data and the first header embedded within the carrier frame, including a second header comprising a synchronization word, a data type identifier and a length value representing a length of at least the frame of audio data and the first header.

11. The data structure of claim 10 wherein the first header comprises a modified Packetized Elementary Stream header.

12. The data structure of claim 10 wherein the second header comprises a modified IEC61937 header.

13. The data structure of claim 10 wherein the frame of audio data comprises a frame of AC-3 encoded audio data.

14. The data structure of claim 10 wherein the frame of audio data comprises one of a plurality of audio frames associated with the first header.

15. The data structure of claim 10 wherein the first header comprises a plurality of modified Packetized Elementary Stream headers embedded within the carrier frame.

16. The data structure of claim 10 and further comprising a plurality of padding bits of a length selected for inclusion of the data structure in a uniform delivery stream of similar data structures.

17. An audio system comprising:

an audio decoder for decoding encoded audio data encoded at a sample rate;

a synchronous data link communicating the encoded audio data to the audio decoder; and transmitting circuitry for transmitting the encoded audio data onto the synchronous data link and operable to:

receive bursts of audio data as part of a packetized elementary audio stream comprising a stream of packets each including a header containing a presentation time stamp and a frame of audio data encoded at the sample rate and transmitted at a selected bit rate;

embed at least a portion of one packet into a payload of a carrier frame compatible with the synchronous data link, the carrier frame including a header having a field indicating a length of the payload; and transmit the carrier frame on the synchronous link.

18. The audio system of claim 17 wherein the transmitting circuitry receives packets containing standard PES headers and modifies the packet header of the at least one packet prior to embedding in the carrier frame.

19. The audio system of claim 17 wherein the transmitting circuitry transmits the carrier frame in a stream of uniformly spaced like carrier frames.

20. The audio system of claim 17 wherein the transmitting circuitry transmits the carrier frame in a stream of carrier frames of variable lengths.

21. The audio system of claim 17 wherein the synchronous link comprises and $I^2S$ link.

* * * * *

UNITED STATES PATENT AND TRADEMARK OFFICE

CERTIFICATE OF CORRECTION

PATENT NO. : 6,804,655 B2
DATED : October 12, 2004
INVENTOR(S) : Miroslav Dokic et al.

It is certified that error appears in the above-identified patent and that said Letters Patent is hereby corrected as shown below:

<u>Title page, Item [54] and Column 1, line 2,</u>
Title, "BURSTY-ASNYCHRONOUS" should be -- BURSTY-ASYNCHRONOUS --.

<u>Column 4,</u>
Line 6, "101", second instance, should be -- I/O --.

<u>Column 7,</u>
Line 23, "These two processes a" should read -- These two processes are --.

<u>Column 10,</u>
Line 15, after "preferred" insert -- fields --.
Table 1, the next to the last line should read:
-- Byte8 PTS[6...0] 7 --.

Signed and Sealed this

Eighteenth Day of January, 2005

JON W. DUDAS
*Director of the United States Patent and Trademark Office*